(12) United States Patent
Sobel et al.

(10) Patent No.: US 8,150,991 B1
(45) Date of Patent: Apr. 3, 2012

(54) GEOLOCATION-BASED APPLICATION STREAMING SYSTEMS, APPARATUS, AND METHODS

(75) Inventors: William E. Sobel, Jamul, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 528 days.

(21) Appl. No.: 12/045,524

(22) Filed: Mar. 10, 2008

(51) Int. Cl.
*G06F 15/16* (2006.01)

(52) U.S. Cl. .......................... 709/231; 709/203

(58) Field of Classification Search .................. 709/203, 709/217–219, 225, 229, 231, 238
See application file for complete search history.

(56) References Cited

U.S. PATENT DOCUMENTS

| | | | | |
|---|---|---|---|---|
| 5,727,129 A | * | 3/1998 | Barrett et al. | 706/10 |
| 6,131,028 A | * | 10/2000 | Whitington | 455/456.2 |
| 6,324,578 B1 | * | 11/2001 | Cox et al. | 709/223 |
| 6,578,066 B1 | * | 6/2003 | Logan et al. | 718/105 |
| 6,696,837 B2 | * | 2/2004 | Konijn | 324/318 |
| 6,792,452 B1 | * | 9/2004 | Philyaw | 709/217 |
| 6,807,558 B1 | * | 10/2004 | Hassett et al. | 709/203 |
| 6,944,447 B2 | * | 9/2005 | Portman et al. | 455/422.1 |
| 7,010,492 B1 | * | 3/2006 | Bassett et al. | 705/1.1 |
| 7,043,231 B2 | * | 5/2006 | Bhatia et al. | 455/412.1 |
| 7,178,720 B1 | * | 2/2007 | Strubbe et al. | 235/375 |
| 7,181,488 B2 | * | 2/2007 | Martin et al. | 709/200 |
| 7,386,477 B2 | * | 6/2008 | Fano | 705/26 |
| 2002/0091568 A1 | * | 7/2002 | Kraft et al. | 705/14 |
| 2003/0115186 A1 | * | 6/2003 | Wilkinson et al. | 707/3 |
| 2009/0043906 A1 | * | 2/2009 | Hurst et al. | 709/231 |

* cited by examiner

*Primary Examiner* — Faruk Hamza
(74) *Attorney, Agent, or Firm* — Advantedge Law Group

(57) ABSTRACT

The disclosure is directed to systems, apparatus, and methods for geolocation-based application streaming. In one example, a system may include a geolocation service that determines the location of a client, and an application server that streams one or more applications to the client on request. The application server may use the location provided by the geolocation service to select an application streaming profile indicating application modules to be initially streamed to clients for that geolocation. After the initial program modules have been streamed to the client, the application server services requests from the client for additional application modules. The application server may log application module requests to create or modify application streaming profiles that specify the application modules to be initially streamed to clients at a particular geolocation. The client or a web server may also specify the application streaming profile to be used by the application server.

17 Claims, 5 Drawing Sheets

GEOLOCATION-BASED APPLICATION STREAMING SYSTEMS, APPARATUS, AND METHODS

BACKGROUND INFORMATION

Application streaming is a method of software distribution in which a client downloads and executes some of an application's executable code and associated resources. As the application executes, additional code and resources are downloaded as needed. Correctly predicting which application code and resources will subsequently be required by an application can reduce delays associated with program execution.

BRIEF DESCRIPTION OF THE DRAWINGS

Various embodiments are described with reference to the accompanying drawings, wherein like reference numbers designate like elements, and in which.

DETAILED DESCRIPTION

Figure 1:
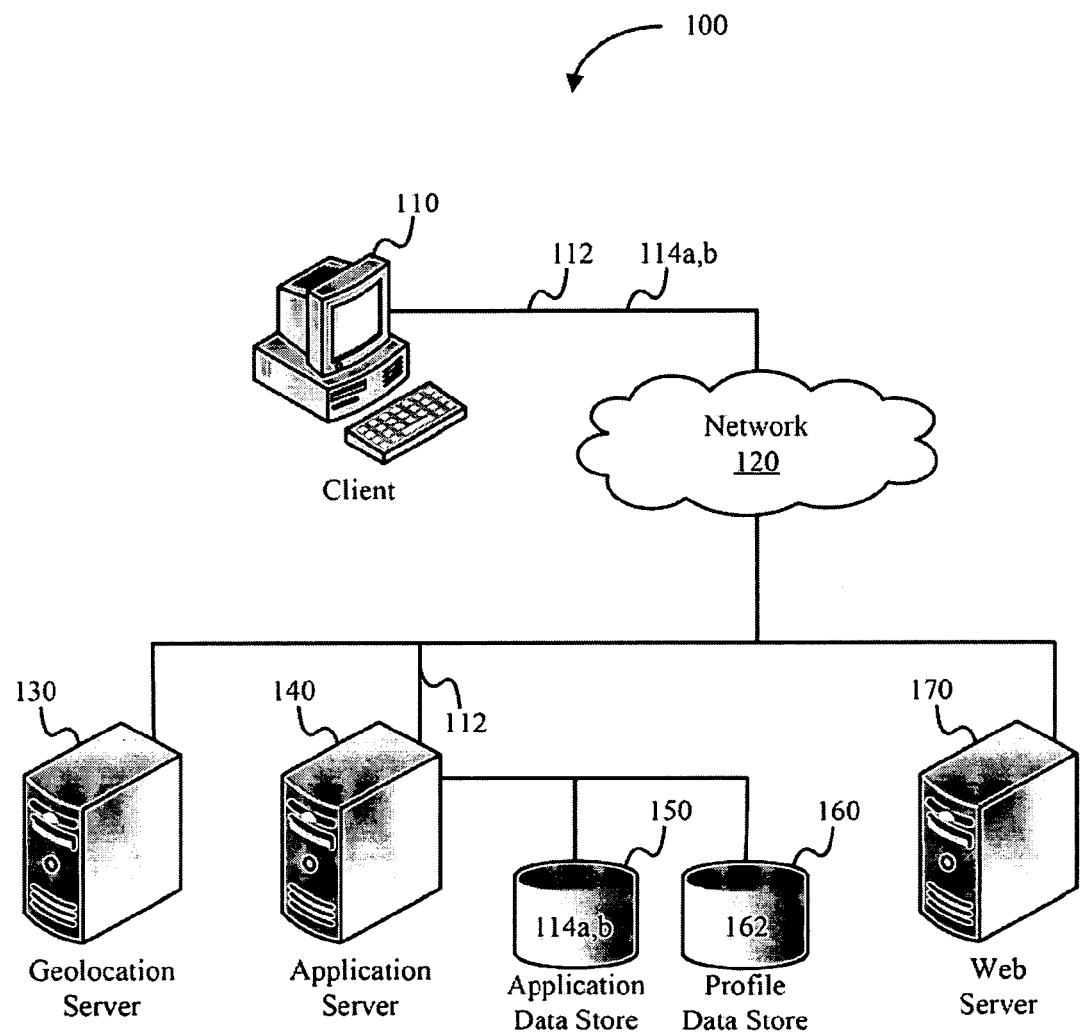
FIG. 1 illustrates components of one embodiment of a computing system configured for efficient application streaming using geolocation information.

The disclosure is directed to systems, apparatus, and methods for geolocation-based application streaming.

It should be appreciated that the examples disclosed herein can be implemented in numerous ways, including as one or more processes, apparatuses, systems, devices, methods, computer readable media, or computer program products embodied on computer readable media.

Many of the functional units described in this specification have been explicitly labeled as components or modules, in order to more particularly emphasize their implementation independence. Others are assumed to be components or modules. For example, a component or module may be implemented as a hardware circuit comprising custom VLSI circuits or gate arrays, off-the-shelf semiconductors such as logic chips, transistors, or other discrete components. A component or module may also be implemented in programmable hardware devices such as field programmable gate arrays, programmable array logic, programmable logic devices or the like.

Components and modules may also be implemented in software for execution by various types of processors. An identified component or module of executable code may, for instance, comprise one or more physical or logical blocks of computer instructions which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. The executable code may be stored on one or more computer readable media. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. As used and explained herein, the phrase "application modules" refers to modules useful in executing a particular application particularly modules that may be downloaded to a client.

In one example, a system is presented for geolocation-based application streaming. The system may include a geolocation service that determines the geolocation of a client. The system may also include an application server that streams one or more applications to the client on request. The application server may use the geolocation provided by the geolocation service to select an application streaming profile that may indicate one or more application modules to be initially streamed to clients at that location. After the initial application modules have been streamed to the client, the application server services requests from the client for additional application modules. The application streaming profile may indicate application modules to be streamed to the client at specific application branch points.

The application server may log application module requests to create or modify application streaming profiles, for example, to increase the efficiency of application streaming or to make the application more responsive to user actions. The application streaming profile may include other information, such as application modules to be streamed to the client at specific application branch points. The client may specify the application streaming profile to be used by the application server. The system may further include, for example, a web server and one or more data stores for applications or application streaming profiles.

Embodiments described herein will be best understood by reference to the drawings. It will be readily understood that the components or modules generally described and illustrated in the drawings herein, could be arranged and designed in a variety of different configurations. Thus, the following detailed description, as represented in the drawings, is not intended to limit the scope of the disclosure but is merely representative of certain embodiments.

Exemplary systems, apparatus, and methods for efficient application streaming with geolocation are described herein. As used herein, the term "computer program" may refer broadly to any set of computer readable instructions embodied on one or more computer readable media, the instructions being executable by one or more computing devices. Computer programs may include, but are not limited to, applications, subroutines, and operating systems.

Geolocating application streaming systems, apparatus, and methods disclosed herein can improve the efficiency or responsiveness of streamed applications. For example, resource files enabled for a particular language can be initially streamed to clients at a location where the language is used. The application user interface can then be displayed in the user's native language at start-up, without a delay to determine the user's language and download the appropriate resources.

Turning now to the drawings, FIG. 1 illustrates components of one embodiment of a computing system 100 (or simply "the system 100") configured for efficient application streaming using geolocation information. As shown, the computing system 100 includes a client 110, an application streaming request 112, application modules 114a and 114b, a network 120, a geolocation server 130, an application server 140, an application data store 150, a profile data store 160, an application streaming profile 162, and a web server 170. The system 100 may increase the efficiency of application streaming or the responsiveness of streamed applications by transmitting selected application modules 114 to the requesting client, based on the client's geolocation.

In certain embodiments, the application streaming system 100 may include any computer hardware and/or instructions (e.g., software or firmware programs), or combinations of software, firmware, and hardware, configured to perform the processes described herein. In particular, it should be understood that system 100 may include any of a number of well known computing devices, and may employ any of a number of well known computer operating systems, including, but by no means limited to, known versions and/or varieties of Microsoft Windows®, UNIX, Macintosh®, and Linux® operating system software.

Accordingly, the processes described herein may be implemented at least in part as instructions (e.g., one or more computer program products) embodied on one or more computer readable media and executable by one or more computing devices. In general, a processor (e.g., a microprocessor) receives instructions, e.g., from a memory, a computer readable medium, etc., and executes those instructions, thereby performing one or more processes, including one or more of the processes described herein. Such instructions may be stored and transmitted using a variety of known computer readable media.

A computer readable medium (also referred to as a processor readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While one embodiment of a computing system 100 is shown in FIG. 1, the components illustrated in FIG. 1 are not intended to be limiting. Indeed, additional or alternative components, implementations, or computing systems may be used to implement the principles and processes described herein.

As depicted in FIG. 1, the client 110 transmits an application streaming request 112 via the network 120. The client 110 may utilize streaming client software to issue the application streaming request 112. For example, the client 110 may use streaming client software such as the AppStream Inc. AppStream™ client, Microsoft® SoftGrid® Application Virtualization client, or Endeavors Technologies' AppExpress®.

In one embodiment, the streaming client software receives an initial set of application modules 114a for execution on the client 110 and requests additional application modules 114b as needed for execution of the application. The network 120 may be variously embodied as the internet, a local area network, a virtual private network, a cellular network, or the like. Application modules may include segments of executable or interpretable code, application resources, files, or the like.

The geolocation server 130 provides a geolocation service that identifies the physical location of the client 110. The geolocation server 130 may locate the client 110 to by comparing the public Internet IP address of the client 110 with known locations of other electronically neighboring servers and routers. The geolocation server may be local or remote to the application server 140.

The application server 140 receives the application streaming request 112 from the client 110 and transmits application modules 114 from the application data store 150 to the client 110. The applications modules 114 may be transmitted to the client 110 in one or more data blocks. The data blocks may be fixed or variable in size. In one embodiment, the data blocks correspond to units of storage on the application data store 150.

The application server 140 may use the geolocation of the client 110 as identified by the geolocation server 130 to select the application streaming profile 162 corresponding to the geolocation from the profile data store 160. The application streaming profile 162 may specify a set of application modules 114a to be streamed initially to the client 110, or application modules 114b to be streamed to the client 110 at specific application branch points.

The application server 140 may be embodied, for example, as an application server such as an AppStream Inc. AppStream™ server, Microsoft® SoftGrid® Application Virtualization server, or Endeavors Technologies' AppExpres® server. In another embodiment, the application server 140 may be a file server hosting applications packaged with application streaming software, such as VMware® Thinstall® packages.

The application streaming system 100 may include a web server 170 that provides an interface between the client 110 and the application server 140. The web server 170 may provide authentication services to determine that a user is authorized to receive an application stream. The web server 170 may limit access to an application to a licensed number of concurrent users. The web server 170 may provide further efficiencies to the application streaming system 100 by caching frequently-used application modules 114, or virtualizing or federating multiple application servers 140.

Figure 2:
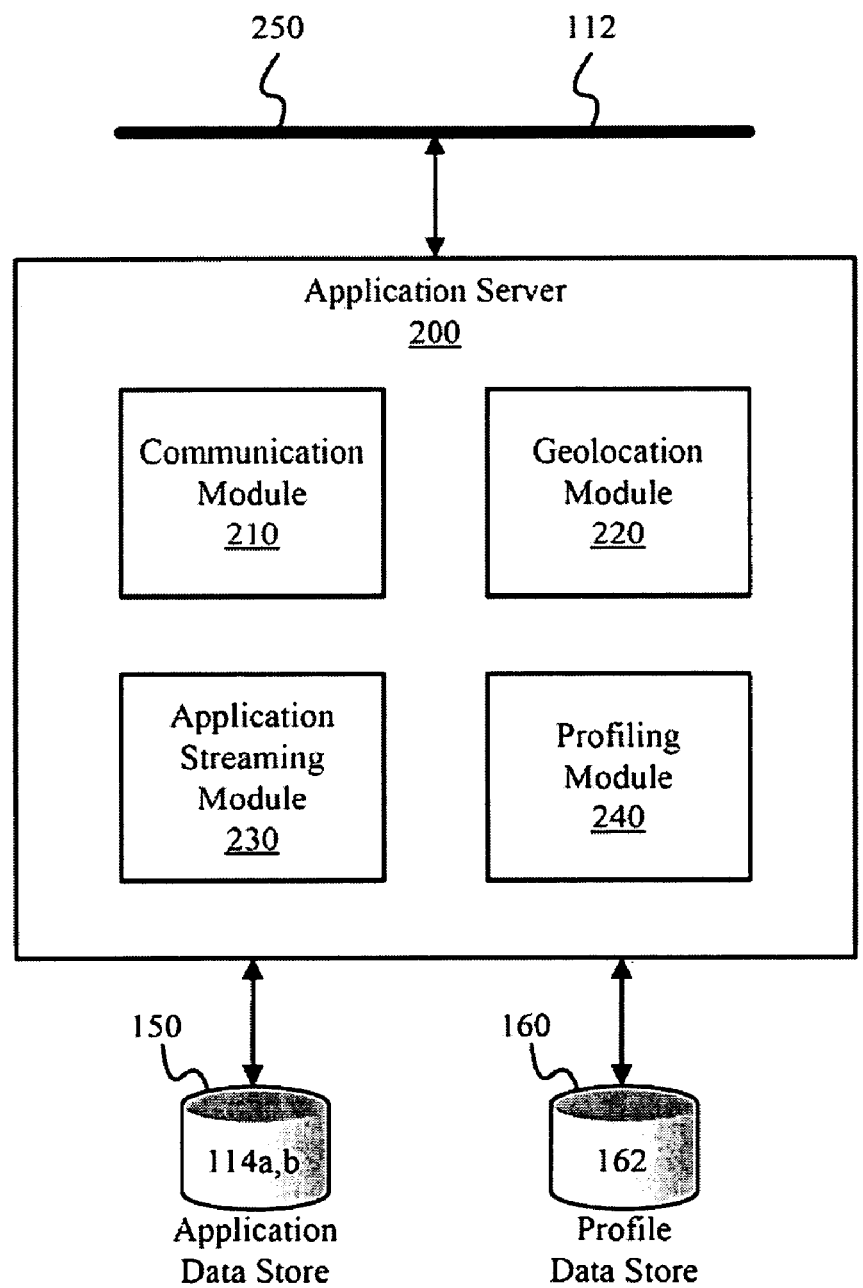
FIG. 2 illustrates components of one embodiment of a geolocating application server.

FIG. 2 illustrates one embodiment of components of a geolocating application server 200 in accordance with certain embodiments. As shown, the geolocating application server 200 may include the application streaming request 112, application modules 114a and 114b, the application data store 150, the profile data store 160, and the application streaming profile 162 from FIG. 1, a communication module 210, a geolocation module 220, an application streaming module 230, a profiling module 240, and a network 250. The geolocating application server 200 may be embodied as a plurality of servers or data stores, for example, the geolocation server 130, application server 140, application data store 150 and profile data store 160 of FIG. 1. In some embodiments, certain components of the geolocating application server 200 may be located on the client 110.

The communication module 210 receives an application streaming request 112 from the client 110 and transmits application modules 114 to the client 110, via the network 250. An application streaming request 112 may come from the client 110 directly, or via a web server 170. The communication module 210 may provide some of the services that may otherwise be performed by the web server 170, such as user authentication or limiting application use to a licensed number of concurrent users.

The geolocation module 220 determines the physical location of the client 110. In one embodiment, the geolocation module 220 communicates with a geolocation service. The geolocation service may be local or remote to the application server 200.

The application streaming module 230 may determine which application modules 114 from the application data store 150 are to be streamed to the client 110 from the application streaming profile 162 corresponding to the geolocation of the client 110. The application streaming module 230 may stream the application modules 114 that are commonly used at a geolocation previous to a request from the client 110.

The profiling module 240 may provide application streaming profiles 162 from the profile data store 160 to the application streaming module 230 for the geolocation specified by the geolocation module 220. The profiling module 240 may monitor requests 112 for application modules 114 from the client 110 to identify how application streaming profiles in the profile data store 160 may be modified to make application streaming more efficient. For example, the profiling module 240 may determine that clients 110 at a particular geolocation frequently make use of a particular set of application modules 114, and overall application performance could be improved by streaming that set of application modules 114 to clients 110 at that geolocation at application initiation or at an execution branch point.

Figure 3:
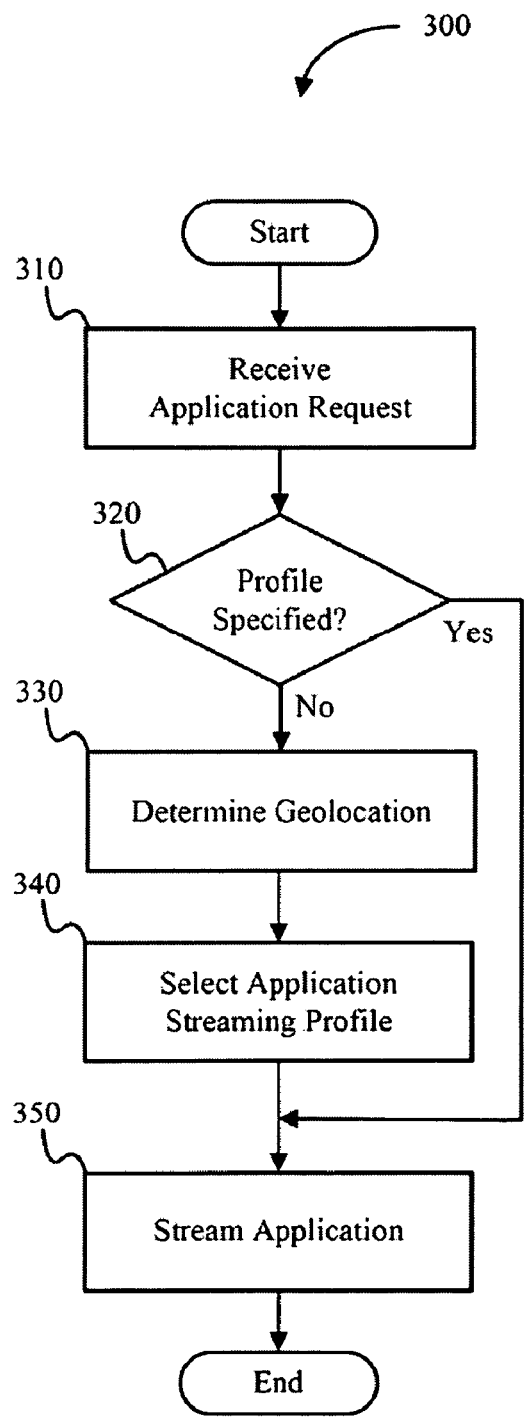
FIG. 3 illustrates components of one embodiment of an application streaming method.
Figure 4:
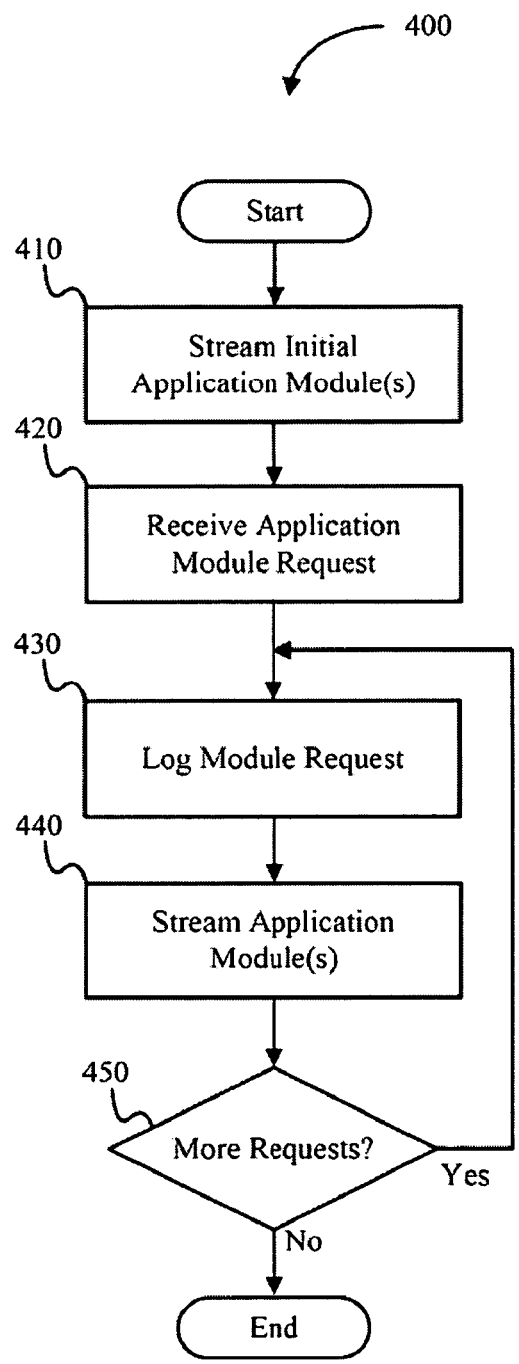
FIG. 4 illustrates additional components of the application streaming method of FIG. 3.
Figure 5:
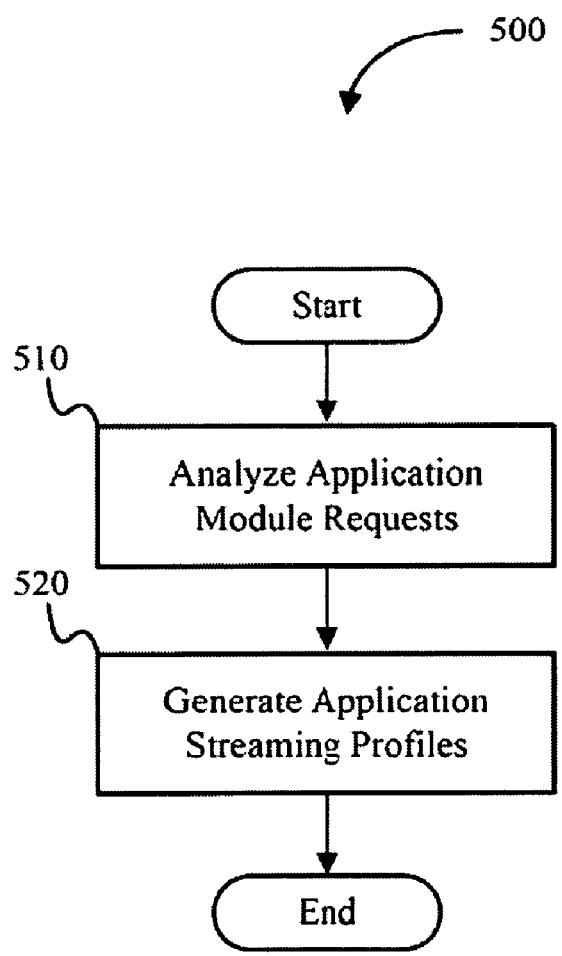
FIG. 5 illustrates components of one embodiment of a geolocation profiling method.

FIGS. 3-5 illustrate components of embodiments of a geolocating application streaming method, an application streaming method, and a geolocation profiling method, respectively. While FIGS. 3-5 illustrate acts according to certain embodiments, other embodiments may omit, add to, reorder, and/or modify any of the acts shown in FIGS. 3-5.

FIG. 3 illustrates one embodiment of an application streaming method 300. As depicted, the geolocating application streaming method 300 includes a receive application request operation 310, a profile specified test 320, a determine geolocation operation 330, a select application streaming profile operation 340, and a stream application operation 350. The geolocating application streaming method 300 facilitates streaming an application to a particular geolocation.

The receive application request operation 310 may receive an application streaming request 112 from the client 110. An application streaming request 112 may come from the client 110 directly, or indirectly, such as via a web server 170. In one embodiment, the receive application request operation 310 also receives from the client 110 a specification of the application streaming profile 162 to be used.

The profile specified test 320 may determine whether an application streaming profile 162 has been specified. In one embodiment, streaming client software on the client 110 includes a configurable option to specify an application streaming profile 162 to be used when streaming application modules 114 to the client 110. In one embodiment, the client 110 or web server 170 may specify an application streaming profile by indicating the geolocation of the client 110.

Specifying an application streaming profile 162 facilitates efficient application streaming when a client 110 requires a different set of application modules 114 than other clients 110 at that geolocation. For example, an application may have a help file localized for the dominant language at each geolocation. While application streaming may be most efficient when the Japanese help file is streamed to clients 110 in Japan, application streaming may be more efficient for a native English-speaking user in Japan if the application streaming profile 162 corresponding to a U.S. geolocation is used.

If an application streaming profile 162 has been specified, the geolocating application streaming method 300 continues with the select stream application operation 350. Otherwise, the geolocating application streaming method 300 continues with the determine geolocation operation 330.

The determine geolocation operation 330 determines the geolocation of the client 110. The determine geolocation operation 330 may locate the client 110 via a geolocation service or by comparing the public Internet IP address of the client 110 with known locations of other electronically neighboring servers and routers. In one embodiment, the client 110 or web server 170 may specify the geolocation of the client 110.

The select application streaming profile operation 340 selects an application streaming profile 162 from the profile data store 160 corresponding to the geolocation determined by the determine geolocation operation 330. The application streaming profile 162 may specify a set of application modules 114a to be streamed initially to the client 110 or a set of application modules 114b corresponding to a particular execution point in the application.

The stream application operation 350 streams the application to the client 110. The stream application operation 350 may initially stream the set of application modules 114a specified in the application streaming profile 162 corresponding to the geolocation of the client 110. As additional application modules 114b are required by the client 110, the streaming client software on the client 110 may request that the application modules 114b be streamed. One embodiment of the stream application operation 350 is further detailed in FIG. 4.

FIG. 4 illustrates additional components 400 of the application streaming method 300 of FIG. 3. The components 400 depict one embodiment of the stream application operation 350. As depicted, the components 400 include a stream initial application module(s) operation 410, a receive application module request operation 420, a log module request operation 430, a stream application module(s) operation 440, and a more requests test 450.

The stream initial application module(s) operation 410 may stream one or more application modules 114a to the client 110 to initiate execution of the application on the client 110. The initial set of application modules 114a to be streamed may be specified by the application streaming profile 162 corresponding to the geolocation of the client 110. In certain embodiments, one or more of the initial set of application modules 114a may not be immediately needed by the client 110 and may be streamed in advance of an actual request by the client 110 and retained on the client 110 in anticipation of subsequent use by the client 110. The application streaming profile 162 that is used to indicate the initial set of application modules may be expressly specified by the client 110, the web server 170, or another component of the system 100 external to the geolocation sever 130.

The receive application module request operation 420 receives a request 112 for an additional application module 114b from the client 110. The additional application module 114b may be streamed to the client 110 along with modules 114b not expressly requested by the client 110. The streamed modules 114b may correspond to an expected execution sequence for the client. For example, after an application is executing on the client 110, a user may select a menu item that requires a particular module 114b to be streamed to the client 110 for the application to execute the code associated with the menu item. Application modules 114b that are expected to be needed by the client 110 may also be streamed to the client 110 along with the particular module 114b.

The log module request operation 430 may log application module requests 112 received by the application server 140. When clients 110 corresponding to a particular geolocation make requests 112 for specific application modules 114, application streaming efficiency may be increased by determining patterns in the application module requests 112 and including the requested application modules 114 in an application streaming profile 162 for that geolocation.

The stream application modules operation 440 streams the requested application module 114 to the client 110 and may also stream additional modules 114 indicated by the application streaming profile 162. The requested modules 114 and the additional modules 114 may be retained on the client for subsequent use and reuse. In certain embodiments, the stream application modules operation 440 may determine if a requested module 114 was previously received by, and is still available to the client 110 and thereby eliminate the need to re-stream the requested module 114.

In one embodiment, the geolocating application server 200 streams the application modules 114 to streaming client software on the client 110. In another embodiment, streaming client software on the client 110 retrieves the application modules 114 from the geolocating application server 200.

The more requests test 450 determines whether another application module request 112 has been received from the client 110. If an additional application module request 112 has been received, the application streaming method 400 continues with the log module request 430. Otherwise, the depicted application streaming method 400 ends.

FIG. 5 illustrates one embodiment of a geolocation profiling method 500. In the depicted embodiment, the geolocation profiling method 500 includes an analyze application module requests operation 510 and a generate application streaming profiles operation 520. The geolocation profiling method 500 facilitates analyzing and profiling application module requests 112 for one or more geolocations.

The analyze application module requests operation 510 may analyze application modules 114 requested by the client 110. Application module requests 112 may have been logged by the log module request operation 430. If clients 110 at a specific geolocation frequently request a particular application module 114 or sequence of modules 114, overall application performance may be improved by including the application module 114 or sequence of modules 114 in the application streaming profile 162 corresponding to the geolocation. Subsequently, the application module or modules 114 may be streamed to the client 110 at application initiation, so the application module 114 will be available when needed at the client 110.

The analyze application module requests operation 510 may include in its analysis factors such as the time required to stream initial application modules 114a to the client 110 before the application begins executing, and the time required to fulfill subsequent application module requests 112. For example, the analyze application module requests operation 510 may determine that the delay after a user selects a menu item may be reduced by streaming an application module 114 before the application begins executing that module, making the application more responsive to user input while slightly increasing the initial download time.

The generate application streaming profiles operation 520 may generate application streaming profiles 162 for one or more geolocations, based on the analysis performed by the analyze application module requests operation 510. The generate application streaming profiles operation 520 may create a new application streaming profile 162 for a geolocation, or modify an existing application streaming profile 162.

The preceding description has been presented only to illustrate and describe exemplary embodiments and implementations with reference to the accompanying drawings. It will, however, be evident that various modifications and changes may be made thereto, and additional implementations may be implemented, without departing from the scope of the invention as set forth in the claims that follow. The above description and accompanying drawings are accordingly to be regarded in an illustrative rather than a restrictive sense.

What is claimed is:

1. A computer-implemented method for geolocation-based application streaming, at least a portion of the method being performed by a computing device comprising at least one processor, the method comprising:
   receiving application streaming requests from a plurality of clients;
   determining a geolocation for each of the plurality of clients;
   generating, by analyzing the application streaming requests, a plurality of application streaming profiles corresponding to various geolocations;
   upon generating the plurality of application streaming profiles, receiving a new application streaming request from a client;
   determining a geolocation of the client;
   selecting, based at least in part on the geolocation of the client, an application streaming profile for the client from within the plurality of application streaming profiles, wherein the application streaming profile identifies one or more application modules that are frequently requested by other clients that are located at the same geolocation as the client and at least one of the application modules is localized for use in a language that corresponds to the geolocation of the client;
   upon selecting the application streaming profile, streaming the application modules identified in the application streaming profile to the client in accordance with the application streaming profile.

2. The method of claim 1, wherein streaming the application modules to the client comprises transmitting the application modules as needed for execution by the client.

3. The method of claim 1, wherein each of the application modules comprises an executable code segment.

4. The method of claim 1, wherein streaming the application modules comprises transmitting the application modules at specific application branch points.

5. The method of claim 1, wherein each of the application modules comprises at least one data block.

6. The method of claim 1, further comprising overriding the application streaming profile corresponding to the geolocation of the client.

7. A system for geolocation-based application streaming, the system comprising:
   an application server comprising at least one processor configured to:
      receive application streaming requests from a plurality of clients;

determine a geolocation for each of the plurality of clients;

generate, by analyzing the application streaming requests, a plurality of application streaming profiles corresponding to various geolocations;

upon generating the plurality of application streaming profiles, receive a new application streaming request from a client;

determine a geolocation of the client;

select, based at least in part on the geolocation of the client, an application streaming profile for the client from within the plurality of application streaming profiles, wherein the application streaming profile identifies one or more application modules that are frequently requested by other clients that are located at the same geolocation as the client and at least one of the application modules is localized for use in a language that corresponds to the geolocation of the client;

upon selecting the application streaming profile, stream the application modules identified in the application streaming profile to the client in accordance with the application streaming profile.

8. The system of claim 7, wherein a first application module is transmitted to the client at an initial application branch point as designated by the application streaming profile.

9. The system of claim 8, wherein a second application module is transmitted to the client at a subsequent application branch point as designated by the application streaming profile.

10. The system of claim 7, wherein the application server is further configured to transmit the application modules to the client as needed for execution by the client.

11. The system of claim 7, wherein each of the application modules comprises at least one data block.

12. The system of claim 7, further comprising a web server configured to direct the client to the application server.

13. The system of claim 7, wherein the client is configured to initiate a request to override the application streaming profile corresponding to the geolocation of the client.

14. An apparatus for geolocation-based application streaming, the apparatus comprising:
a profiling module configured to:
receive application streaming requests from a plurality of clients;
determine a geolocation for each of the plurality of clients;
generate, by analyzing the application streaming requests, a plurality of application streaming profiles corresponding to various geolocations;
a communication module configured to receive a new application streaming request from a client;
a geolocation module configured to determine a geolocation of the client;
an application datastore configured to store application modules corresponding to an application;
an application streaming module configured to:
select, based at least in part on the geolocation of the client, an application streaming profile for the client from within the plurality of application streaming profiles, wherein the application streaming profile identifies one or more application modules that are frequently requested by other clients that are located at the same geolocation as the client and at least one of the application modules is localized for use in a language that corresponds to the geolocation of the client;
upon selecting the application streaming profile, stream the application modules identified in the application streaming profile to the client in accordance with the application streaming profile;
at least one processor configured to execute the profiling module, the communication module, the geolocation module, and the application streaming module.

15. The apparatus of claim 14, further comprising a profile data store configured to store the application streaming profiles.

16. The apparatus of claim 14, wherein the application streaming module is further configured to transmit the identified application modules to the client as needed for execution by the client.

17. The apparatus of claim 14, wherein the application streaming profile is further configured to transmit the identified application modules at specific application branch points.

* * * * *